Patented Mar. 16, 1943

2,314,142

UNITED STATES PATENT OFFICE 2,314,142

CATALYTIC HYDROGENATION

Stanley C. Haney, Chicago, Ill., assignor to Sinclair Refining Company, New York, N. Y., a corporation of Maine No Drawing. Application March 10, 1939,
Serial No. 260,913

6 Claims. (Cl. 196—43)

This invention relates to improvements in catalytic hydrogenation and, more particularly, to improvements in the preliminary purification of hydrogen or hydrocarbons, or both, charged to the hydrogenation operation whereby the active life of the hydrogenation catalyst is greatly prolonged.

It is well established that one of the chief sources of nickel catalyst poisoning in catalytic hydrogenation operations is the presence of free oxygen in the charging stock to the operation. This oxygen is usually introduced into the operation as an impurity in the hydrogen supplied to the process but is also found in the hydrocarbon charge due to leaks in the apparatus or faulty technique, of both, and the resulting oxidized or "poisoned" nickel must be regenerated to restore its catalytic activity. Oxygen-poisoning of a nickel catalyst differs from other poisoning of the catalyst in that the catalyst thus poisoned with oxygen is difficultly regenerated and even then the regenerated product does not possess the high level of activity of the original catalyst. Accordingly, oxygen-poisoned nickel catalysts must be discarded after a comparatively small number of regenerations.

It has been proposed heretofore to remove oxygen from the charging stock to a catalytic hydrogenation operation by first passing the charging stock in contact with spent nickel catalyst at an elevated temperature. This proposal has been adopted commercially but is uneconomical and unsatisfactory due to the fact that the spent catalyst does not completely remove all of the oxygen from the charge and to the fact that fresh catalyst is expensive.

I have discovered that the life of nickel catalysts may be increased several fold by passing the oxygen-containing charging material for the hydrogenation operation first in contact with finely divided copper. I have found that the copper acts to transform the oxygen into water, the latter having no deleterious effect upon an active nickel catalyst. In the event that either the hydrogen or the unsaturated hydrocarbons contains no free oxygen, only that material which does contain free oxygen need be treated with the activated copper. In practice, however, both the hydrogen and the unsaturated hydrocarbons contain uncombined oxygen and in such a case both of these charging materials are subjected with advantage to purification with activated copper. The copper catalyst has the advantages that it is effective in removing oxygen within the same temperature range as that required for hydrogenation with the nickel catalyst and that the pretreatment of charging stock with the copper catalyst maintains the nickel catalyst at a substantially uniform high level of activity over a long period of operation.

Finely divided copper deposited on an asbestos support may be used with particular advantage. Such a catalyst may be readily prepared by forming a suspension of shredded asbestos in a solution of copper nitrate and subsequently precipitating copper hydroxide on the asbestos fiber by adding an amount of sodium hydroxide substantially equivalent to the copper nitrate content of the mixture. The asbestos containing precipitated copper hydroxide is then removed, washed, and dried. The dried catalyst may be broken advantageously into small particles to produce an increased surface area. The dried asbestos-copper hydroxide particles are then subjected to a stream of hydrogen at a temperature above about 300° F. in order to reduce the copper compound to metallic copper.

The use of a copper catalyst in accordance with my invention may be readily embodied in the standard catalytic hydrogenation operation by interposing the copper catalyst contact step intermediate the heating operation and the subsequent nickel catalyst contact. For example, a mixture of unsaturated hydrocarbons to be hydrogenated and the requisite amount of hydrogen are first passed through a vaporizer in order to establish the proper temperature for the hydrogenating operation, and this vaporized mixture is then passed through a tower filled with an activated copper catalyst such as that prepared as described above. Oxygen contained in the initial charge to the vaporizer is transformed into water vapor in the copper catalyst tower and the resulting gaseous product is then passed directly through the nickel catalyst tower in accordance with the standard operation. A slight excess of hydrogen may be added to the charging mixture to compensate for the amount of hydrogen which combines with the free oxygen to form water thus leaving the requisite quantity of hydrogen in the mixture charged to the hydrogenation operation. The water vapor contained in the charge to the nickel catalyst tower has no poisoning effect upon the nickel catalyst although the water vapor may be removed from the charge by any appropriate means prior to the hydrogenation operation in order to maintain the nickel catalyst at the desired state of hydration. I have found that in accordance with the above-described procedure a nickel catalyst maintains its activity for a period as long as about thirty hours whereas identical treatment except for the elimination of the copper catalyst treatment necessitates regeneration of the nickel catalyst after a period of from eight to ten hours. The effectiveness of the copper catalyst in eliminating oxygen from the charging stock is readily apparent when it is considered that hydrogen gas containing about 1.7% oxygen passed at a temperature of 350° F. and at an hourly space velocity of 14.6 through a tube containing activated copper supported on asbestos yielded hydrogen in which no oxygen could be detected with the standard Orsat apparatus.

It will be seen, therefore, that by pretreating the hydrogen and unsaturated hydrocarbon charge to a hydrogenation operation with activated copper in accordance with my invention salient improvements are realized in continuity and efficiency of operation together with greatly increased useful life of the nickel catalyst. These improvements are fully realized by the use of an activated copper comprising finely divided copper supported on asbestos fiber. However, other substantially inert supporting materials may be used with advantage and copper turnings or other finely divided form of copper may be used. Furthermore, the copper catalyst may be placed with advantage in the bottom of the nickel catalyst tower rather than in a separate tower, it being necessary only to insure contact between the oxygen-containing charge and the copper catalyst prior to the contact between the nickel catalyst and the purified charge.

I claim:

1. In the catalytic hydrogenation of unsaturated hydrocarbons wherein a heated mixture of hydrogen and unsaturated hydrocarbons initially containing free oxygen is passed in contact with a nickel catalyst, the improvement which comprises subjecting the heated mixture at a temperature approximating that employed in effecting the hydrogenation to the action of preformed finely divided copper deposited on a substantially inert supporting material prior to its contact with the nickel catalyst.

2. In the catalytic hydrogenation of unsaturated hydrocarbons wherein a heated mixture of hydrogen and unsaturated hydrocarbons initially containing free oxygen is passed in contact with a nickel catalyst, the improvement which comprises subjecting the heated mixture at a temperature approximating that employed in effecting the hydrogenation to the action of preformed activated copper supported on asbestos fiber, produced by precipitating copper hydroxide on shredded asbestos and thereafter reducing the copper hydroxide to metallic copper by the action of a stream of hydrogen at an elevated temperature, prior to its contact with the nickel catalyst.

3. In the catalytic hydrogenation of unsaturated hydrocarbons wherein a heated mixture of hydrogen and unsaturated hydrocarbons and further containing free oxygen is passed in contact with a nickel catalyst, the improvement which comprises passing the heated mixture at a temperature approximating that employed in effecting the hydrogenation in contact with preformed activated copper, produced by reducing precipitated copper hydroxide to metallic copper by the action of a stream of hydrogen at an elevated temperature, prior to its contact with the nickel catalyst.

4. In the catalytic hydrogenation of unsaturated hydrocarbons wherein unsaturated hydrocarbons are passed in contact with a nickel catalyst in the presence of hydrogen initially containing free oxygen, the improvement which comprises subjecting the unsaturated hydrocarbons and the hydrogen to the action of preformed finely divided copper at an elevated temperature approximating that employed in effecting the hydrogenation prior to contact with the nickel catalyst.

5. In the catalytic hydrogenation of unsaturated hydrocarbons in the presence of a nickel catalyst wherein the catalyst is subject to poisoning by free oxygen contained in at least one of the materials charged to the hydrogenation operation, the improvement which comprises removing oxygen from the oxygen-containing charging material by subjecting said material to the action of preformed finely divided copper at an elevated temperature approximating that employed in the hydrogenation operation prior to the introduction of said charging material into the hydrogenation operation.

6. In the catalytic hydrogenation of unsaturated hydrocarbons wherein a heated mixture of hydrogen and unsaturated hydrocarbons initially containing free oxygen is passed in contact with a nickel catalyst, the improvement which comprises passing the heated mixture at a temperature approximating that employed in effecting the hydrogenation in contact with preformed finely divided copper prior to its contact with the nickel catalyst.

STANLEY C. HANEY.